July 31, 1956 D. J. TOMCIK 2,757,244

BROAD BAND AMPLIFIER FOR TELEVISION SYSTEMS

Original Filed Oct. 11, 1950

Inventor:
Daniel J. Tomcik
By: Alois W. Graf
attorney.

2,757,244
Patented July 31, 1956

2,757,244

BROAD BAND AMPLIFIER FOR TELEVISION SYSTEMS

Daniel J. Tomcik, South Bend, Ind., assignor to Electro-Voice, Incorporated, Buchanan, Mich.

Original application October 11, 1950, Serial No. 189,596, now Patent No. 2,679,001, dated May 18, 1954. Divided and this application September 13, 1951, Serial No. 248,165

7 Claims. (Cl. 179—171)

The present invention relates to a television receiving system, and more particularly to such system which utilizes a booster amplifier.

In the fringe areas of television reception it has been found advantageous to provide additional amplification for the television signals by means of boosters. Such boosters generally have had tuning means of one form or another so that in order to provide the desired amplification the booster would have to be tuned at the same time that the television receiver was tuned. It, of course, is apparent that it would be desirable to provide a booster, which would not require switching or tuning. The present practice of using boosters also has the disadvantage that they are usually located adjacent the television receiver so that the noise picked up by the transmission line between the receiver and the antenna is amplified.

In accordance with the present invention it is proposed to obviate certain disadvantages encountered in the past practice of employing boosters in fringe area reception. By providing a broad band amplifier it is possible to provide booster action without the necessity of switching or tuning the booster. By arranging for the location of the booster adjacent the antenna a better signal-to-noise ratio can be obtained, which is of particular advantage for fringe area reception.

It is, therefore, an object of the present invention to provide an improved television booster having broad band transmission characteristics to obviate tuning or switching the booster when the receiver is changed to receive a different channel.

Another object of this invention is to provide a television booster arranged to operate over two separated frequency bands without switching means.

A further object of the present invention is to provide a television booster located adjacent the antenna to obviate amplifying noise picked up by the transmission line.

A further object is to provide a television booster located adjacent the antenna without requiring additional electrical conductors to supply power thereto.

Still another object of this invention is to provide a television receiving system using booster amplification with a transmission line which conducts both power and signal energies.

A still further object is to provide a television booster having circuit means for obviating or minimizing the effects of variations or dissimilarities in wiring and in components.

Still another object of the invention is to provide an improved push-pull amplifier circuit utilizing untapped coupling transformers.

Other and further objects of the present invention will become apparent by reference to the following description taken in conjunction with the accompanying drawing, wherein.

Figure 1:
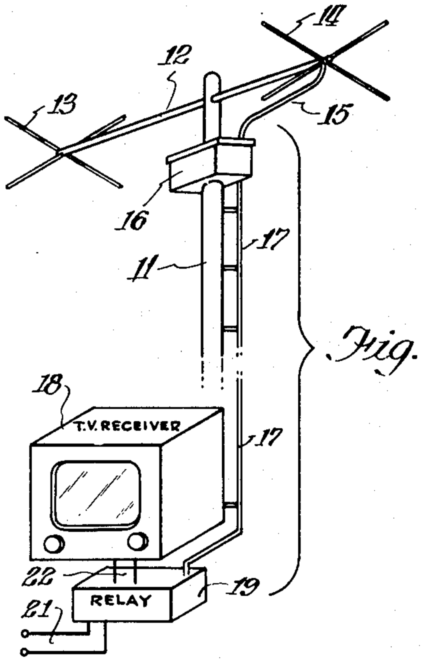
Figure 1 is a perspective representation of a television system embodying the present invention.

In Figure 1 there is shown an antenna mast 11 carrying a transverse support 12, which has at one end a reflector 13 and at the other end an antenna 14. The antenna 14 is connected by a transmission line 15 to a booster contained in the housing 16. A transmission line 17 extends from the booster 16 to a television receiver 18 and to a relay unit 19. The relay unit 19 has a pair of conductors 21 arranged to be connected to a suitable source of electric power, such as the conventional electric outlet. The electrical conductors or power cord 22 of the television receiver are plugged into a suitable receptacle in the relay unit 19.

Figure 2:
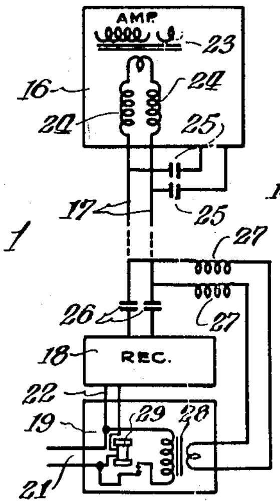
Figure 2 is a block and circuit diagram of the system shown in Figure 1.

In Figure 2 it will be noted that the transmission line 17 extends between the booster amplifier 16 and the receiver 18 and the relay unit 19. The transmission line 17 serves to supply low voltage alternating current to the power transformer 23 of the booster amplifier, which is isolated with respect to high frequency currents from the transmission line 17 by a pair of choke coils 24. A pair of capacitors 25 couples the transmission line 17 to the output circuit of the amplifier 16. The capacitors 25, therefore, serve to isolate the output circuit of the amplifier 16 from the power current following through the transmission line 17.

At the other end of the transmission line 17 a pair of capacitors 26 couple the line to the signal input terminals of the television receiver 18. The line 17 is connected through a pair of choke coils 27 to the relay unit 19, which supplies low voltage alternating current. The choke coils 27 isolate the relay unit with respect to the high frequency currents transmitted by the transmission line 17. In the preferred embodiment the relay unit 19 contains a power transformer, which steps down the voltage to 24 volts. Thus 24 volt alternating current is transmitted through the line 17 to the transformer 23, which steps down the potential for the filament circuit and steps up the potential for the anode power.

The relay unit 19, therefore, contains a step-down transformer 28, which is switched into circuit by a series relay 29 connected between the conductors 21 and 22.

Figure 3:
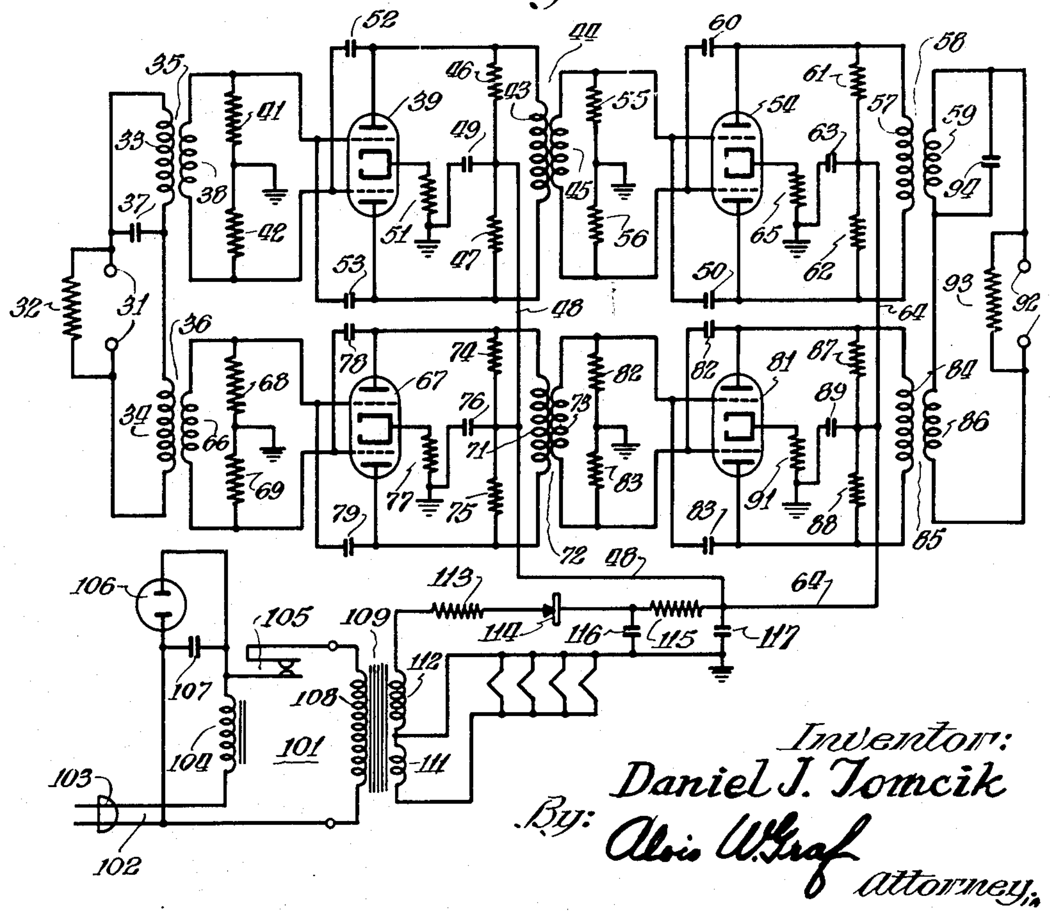
Figure 3 is a circuit diagram showing certain details of the amplifier employed in the systems shown in Figures 1 and 2 and also illustrating another application of the present invention.

The circuit diagram shown in Figure 3 gives the details of the signal amplifier contained within the housing 16. The amplifier is provided with a pair of input terminals 31 across which may be connected a matching resistor 32. The terminals 31 are connected to series inductors 33 and 34, which serve as primary windings of two transformers 35 and 36 respectively. The transformer 35 is designed to transmit television signals in the lower frequency range whereas the transformer 36 is arranged to transmit signals in the upper band of frequencies. In order that the higher television frequencies may not be attenuated by the high inductance of a primary winding 33 of the transformer 35, a capacitor 37 is arranged to bypass the winding 33 for the higher frequencies.

The transformer 35 has a secondary winding 38, which is untapped and which has its outer terminals connected to the grids of a pair of vacuum tubes, which may be contained within a single envelope 39. Push-pull amplification is utilized in order to provide a high L to C ratio. The inductance of the winding 38 is such that the distributed capacity of the tubes 39 tunes the circuit to transmit a band of frequencies somewhat greater than those included between 55 to 88 megacycles. A pair of resistors 41 and 42 are connected in series across the winding 38 and the common juncture thereof connected to ground so that no mid-tap need be provided on the winding 38. The use of the pair of resistors 41 and 42 in the grid circuits of the tubes 49 has the advantage of minimizing or obviating the effects of unbalance due to capacitance to ground occurring by virtue of wiring variations or other dissimilarities.

The anodes of the tubes 39 are connected to an untapped primary winding 43 of a transformer 44 having a secondary winding 45, which also is untapped. A pair of resistors 46 and 47 are connected between the anodes of the tubes 39. The common juncture of these resistors is connected to the anode potential conductor 48. The common juncture between the resistors is connected to a grounded capacitor 49. The cathodes of the tubes 49 are self-biased by a grounded resistor 51. The push-pull circuit is neutralized by the use of a neutralizing capacitor 52 connected between the grid of one vacuum tube and the anode of the other. In a similar manner another neutralizing capacitor 53 is employed between the anode of the first tube and the grid of the second tube.

The first stage of amplification is followed by a second stage of push-pull amplification, which includes two vacuum tubes contained within a single envelope 54. The grids of the tubes are connected to the outer terminals of the secondary winding 45 of the transformer 44, which are also connected to the pair of series resistors 55 and 56 having the common juncture grounded.

The anodes of the vacuum tubes contained within the envelope 54 are connected to the primary winding 57 of a transformer 58 having a secondary winding 59. The primary and secondary windings of the transformer 58 are untapped. A pair of resistors 61 and 62 are connected in series across the winding 57 and their common juncture is connected to a grounded capacitor 63 and to the anode potential conductor 64. The tubes contained within the envelope 54 are self-biased by a grounded resistor 65.

The higher television frequencies in the range of 174 to 216 megacycles are amplified by two similar push-pull amplifiers connected to the secondary winding 66 of the transformer 36. The outer terminals of the secondary winding 66 are connected to the grids of two vacuum tube elements contained within the envelope 67. A pair of resistors 68 and 69 are connected across the winding 66 and have their common juncture connected to ground. The anodes of the tube 67 are connected to the primary winding 71 of a transformer 72 having a secondary winding 73. A pair of resistors 74 and 75 are connected in series across the winding 71 and have their common juncture connected to the anode potential conductor 48 and to a grounded capacitor 76. A self-biasing resistor 77 is connected between ground and the cathodes of the vacuum tube elements 67. The push-pull amplifier formed by the use of these components and the vacuum tube 67 is neutralized by the use of capacitors 78 and 79 connected between the anodes of the triodes within the element 67 and the grids of the opposite triode.

The secondary winding 73 of the transformer 72 is connected to the grids of a pair of triodes contained within an envelope 81. A pair of resistors 82 and 83 have their common juncture grounded or connected across the winding 73. The anodes of the triodes within the envelope 81 are connected to the primary winding 84 of a transformer 85 having a secondary winding 86. Two similar resistors 87 and 88 are connected across the winding 84 and have their common juncture connected to the anode potential conductor 64 and a grounded capacitor 89. A self-biasing resistor 91 is provided between ground and the cathodes of the triodes within the envelope 81. Neutralizing capacitors 82 and 83 are associated with the anodes and grids of the triode elements within the envelope 81.

The secondary windings 59 and 86 of the transformers 58 and 85 are connected in series and to the output terminals 92, which may be bridged by a balancing resistor 93. A high frequency shunt path is provided by a capacitor 94 connected across the secondary winding 59. From this it will be appreciated that in both the input and output circuits means are provided for efficiently receiving and transmitting two widely separated frequency bands such as those now encountered in present television reception. The various features which characterize the lower frequency amplifier shown in the upper half of the circuit diagram in Figure 3 are, of course, also embodied in the later cascade push-pull amplifier for the higher frequencies.

Figure 4:
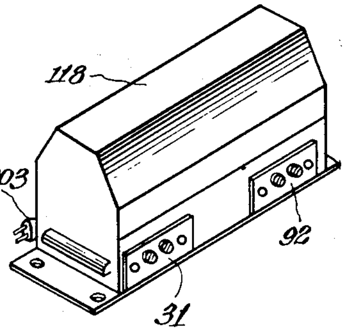
Figure 4 is a perspective view of a cabinet housing the apparatus and components used in the circuit of Figure 3.

The push-pull amplifier heretofore described is contained within the housing 16 of Figures 1 and 2 where it is desired to have the amplifier as close as possible to the receiving antenna. In other areas where a booster may be desirable but no appreciable noise is picked up by the transmission line, a more economical arrangement, of course, is to have the booster located adjacent the television receiver. This may be done and yet, since no tuning is required, this booster would offer some of the same advantages heretofore mentioned in connection with the embodiments shown in Figures 1 and 2. Where the amplifier is to be located adjacent the receiver there is provided a relay unit 101, which includes a pair of conductors 102 terminating in a suitable plug 103 for connection to an outlet receptacle. One of the conductors 102 is connected through the winding 104 of a relay having a pair of normally open contacts 105. The winding 104 of the relay is connected in series between the plug 103 and a receptacle 106, which receives the power cord plug attached to the conductors 22 of the television receiver. Thus whenever the receiver is turned on, current will flow through the winding 104 of the relay thus causing it to close its contacts. A suitable filter capacitor 107 may be connected across the contacts of the receptacle 106 to minimize the effect of any stray radio frequency energy entering the power cord 22 from the receiver 18. One of the contacts of the relay 105 is connected to the upper terminal of the winding 104, and the other contact is connected to one terminal of the primary winding 108 of a transformer 109. The other terminal of the primary winding 108 is connected to the other side of the plug 103. The transformer 109 has two secondary windings 111 and 112. The secondary winding 111 supplies current for the filaments of the vacuum tubes 39, 54, 67 and 81. The high voltage secondary winding 112 has a terminal connected through a current limiting resistor 113, which is in series with a rectifier 114, which in accordance with present practice may be of the selenium type. The output of the rectifier 114 passes through a smoothing resistor 115, which has one terminal connected to the anode potential conductors 48 and 64. Suitable filter capacitors 116 and 117 are connected from the terminals of the filter resistor 115 to ground.

Where the apparatus is to be located adjacent the television receiver, it may be housed within a suitable cabinet 118 shown in Figure 4. On the one side of the cabinet two terminal plates are provided with the input connections 31 and the output connections 92. On the opposite side of the cabinet there is connected the conductor cord 102 having at its end a plug 103. Adjacent the point where the conductors 102 pass into the cabinet 118, there is provided the outlet receptacle 106.

From the foregoing it is believed that it will be apparent to those skilled in the art that certain advantageous results are obtained by employing the system shown in Figure 2. In the actual physical embodiment of the system shown in Figure 2 it, of course, would be understood that the capacitors 25 are contained within the housing provided for the booster 16. It furthermore will be appreciated that the relay unit 19 contains the capacitors 26 and the inductors 27. While the circuit arrangement illustrated employs pairs of capacitors and inductors at each end of the transmission line 17, a comparable effect can be obtained by the use of a single capacitor and a single inductor at each end of the line 17. Such an embodiment might be dictated where economy is of prime consideration.

It furthermore will be appreciated that the unit housing the booster 16 has a transformer 23 provided with secondary windings, which correspond to the windings 111 and 112 of the transformer 109 of Figure 3. Therefore, the housing 16 shown in Figure 1 includes all of the circuit elements shown in Figure 3, except that portion of the circuit to the left of the terminals of the primary winding 108 of the transformer 109. In addition, the container or housing 16 includes at least one inductor, such as the inductor 24, and one capacitor, such as the capacitor 25.

While it has been found preferable in the arrangements shown in Figures 2 and 3 to utilize relay means for supplying power to the booster amplifier, the same effects could be produced by a manually operated switch wherever economy dictates a reduction in the number of components employed.

While for the purposes of illustrating and describing the present invention certain preferred embodiments have been shown in the drawing, it is to be understood that the invention is not to be limited thereby, since such variations in the circuit elements and physical arrangements are contemplated as may be commensurate with the spirit and scope of the invention set forth in the accompanying claims.

I claim as my invention:

1. A broad band television booster comprising a plurality of push-pull amplifiers having different frequency characteristics interposed in parallel between an input circuit and an output circuit, each of said circuits having two impedances connected in series, one of said impedances having a high value at the higher frequencies to be transmitted by one of said amplifiers of said booster, said latter impedance having a shunt path presenting a low impedance to said higher frequencies and a high impedance to the lower frequencies to be transmitted, and means coupling each of said first mentioned impedances to a different one of said amplifiers.

2. A broad band television signal booster for amplifying signals without variable tuning comprising a common input circuit having two different impedances in series, one of said impedances being coupled to a multi-stage push-pull neutralized amplifier for a band of television channels including 55 to 88 megacycles, and the other of said impedances being coupled to another similar push-pull amplifier for another band of television channels including 174 to 216 megacycles, each amplifier including a plurality of loosely coupled transformers between stages having a single primary winding and a single secondary winding, said windings each being tuned by the distributed capacitance of the associated push-pull tubes thereby providing a high L to C ratio, and a pair of series resistors connected across each transformer winding, means for maintaining the common juncture of each pair of resistors at radio frequency ground potential, and a common output circuit having two different impedances in series each coupled to a different one of said amplifiers.

3. A broad band television booster comprising an input circuit adapted to be connected by a transmission line to an antenna and having two impedances connected in series across said line, one of said impedances having a high value at the higher frequencies, said latter impedance having a shunt path presenting a low impedance value at the higher frequencies and a high impedance value at the lower frequencies, and a plurality of push-pull amplifiers having different frequency characteristics each coupled to a different one of said first mentioned impedances, said amplifiers having a common output circuit for said higher and said lower frequencies.

4. A broad band television booster comprising an input circuit adapted to be connected to a transmission line leading to an antenna and having two different inductors connected in series across said line, one of said inductors having a high impedance value at the higher frequencies, the other inductor having a low impedance value at the lower frequencies, a shunt path for said first inductor having a low impedance value at the higher frequencies and a high impedance value at the lower frequencies, and a plurality of parallel push-pull amplifiers having input circuits of different frequency responses each inductively coupled to a different one of said first mentioned inductors, and a common output circuit for said amplifiers, said output circuit having a higher frequency path coupled to a single one of said amplifiers and a lower frequency path coupled to both of said amplifiers.

5. A broad band television booster comprising an output circuit adapted to be connected to a transmission line leading to television receiver and having two impedances connected in series across said line, one of said impedances having a high value at the higher frequencies, said latter impedance having a capacitive shunt path presenting a low impedance value at the higher frequencies and a high impedance value at the lower frequencies, and a plurality of parallel push-pull amplifiers each coupled to a different one of said first mentioned impedances, one of said amplifiers transmitting primarily said higher frequencies and the other transmitting primarily said lower frequencies.

6. A broad band television booster comprising an input circuit adapted to be connected to a transmission line leading to an antenna and having two different inductors connected in series, one of said inductors having a high impedance value at the higher frequencies, a capacitive shunt path across said inductor having a low impedance value at the higher frequencies and a high impedance value at the lower frequencies, the other inductor having a low impedance at the lower frequencies, a multi-stage push-pull amplifier inductively coupled to the first one of said inductors for amplifying the lower frequencies, a second similar multi-stage push-pull amplifier inductively coupled to the other of said inductors for amplifying the higher frequencies, and an output circuit for interconnecting said amplifiers with a television receiver, said output circuit having two different inductors connected in series, one of said inductors having a high impedance value at the higher frequencies and being inductively coupled to the output of said first push-pull amplifier, a capacitive shunt for said inductor having a low impedance value at the higher frequencies and a high impedance value at the lower frequencies, the other inductor of said output circuit being inductively coupled to the output of said other amplifier, said other inductor having a low impedance value at the lower frequencies.

7. A television booster in accordance with claim 6 wherein each push-pull amplifier includes a plurality of loosely coupled transformers having a single primary winding and a single secondary winding, each of said windings being tuned by the distributed capacitance of the associated tubes thereby providing a high L to C ratio.

References Cited in the file of this patent

UNITED STATES PATENTS

| | | |
|---|---|---|
| 1,936,438 | Roder | Nov. 21, 1933 |
| 1,965,720 | Nicholson | July 10, 1934 |
| 1,971,235 | Rettenmeyer | Aug. 21, 1934 |
| 2,068,685 | Lansing | Jan. 26, 1937 |
| 2,120,122 | Zillger | June 7, 1938 |
| 2,215,790 | Hornung et al. | Sept. 24, 1940 |
| 2,222,169 | Buschbeck et al. | Nov. 19, 1940 |
| 2,433,380 | Maddock | Dec. 30, 1947 |
| 2,572,183 | Nelson et al. | Oct. 23, 1951 |

FOREIGN PATENTS

| | | |
|---|---|---|
| 847,653 | France | July 3, 1939 |
| 678,547 | Germany | July 18, 1939 |